Sept. 5, 1961     E. GRESSEL     2,998,984
COUPLING FOR PLASTIC LINED PIPE
Filed Nov. 4, 1957

United States Patent Office 2,998,984
Patented Sept. 5, 1961

2,998,984
COUPLING FOR PLASTIC LINED PIPE
Edmond Gressel, Schulstrasse 54, Aadorf, Switzerland
Filed Nov. 4, 1957, Ser. No. 694,402
4 Claims. (Cl. 285—55)

The present invention relates to joining successive sections of lined pipe comprising an outer shell or casing and an inner lining. The term "section" is used in a generic sense to include either a length of pipe, or a fitting such as an elbow, T or cross.

Lined pipe is useful in many applications. For example, it is used in handling drug and food products to avoid contamination. It is also used in pipe lines for chemicals of a corrosive nature. Lining may likewise be used to resist erosion or abrasion. The shell or casing is formed of steel or other high strength material and provides the mechanical strength needed for the pipe. The lining is formed of material selected for the characteristics needed for a particular application. For example, it may be formed of elastomer material such as natural or synthetic rubber composition or a plastic material for example polyethylene, polystyrene or polyvinylchloride resin.

Joining successive sections of lined pipe presents problems not encountered with unlined pipe. It is necessary to provide complete continuity of the lining to protect the shell from the line material or conversely to prevent contamination of the line material by the shell. The lining of one section must be joined with the lining of a successive section in a fluid tight joint. However, in making such a joint it is necessary to avoid subjecting the lining to accessive stress since it is of relatively low strength material. Hence, it is necessary to have a strong mechanical connection between the shells of successive pipe sections to provide the required strength. A further problem arises from the fact that elastomer or plastic material has a tendency to "flow" when subjected to pressure. Hence, even if there is an initial seal, a leak may develop by the flow of the lining material.

It is an object of the present invention to provide an improved pipe joint for lined pipe that assures high mechanical strength and a permanent fluid-tight seal under operating conditions. In accordance with the invention, means is provided for mechanically joining the shells of successive pipe sections to provide a strong joint. End portions of the lining extend beyond the ends of the shells and are flared outwardly to form flanges. Means is provided for continually pressing the flange portions of the lining together to provide a fluid-tight seal. The pipe joint in accordance with the invention thus assures continued fluid-tightness combined with high mechanical strength.

The objects, characteristics and advantages of pipe joints in accordance with the present invention will appear more fully from the following description and claims in conjunction with the accompanying drawings which show by way of example a preferred pipe joint construction in accordance with the invention. In the drawings:

Figure 1:
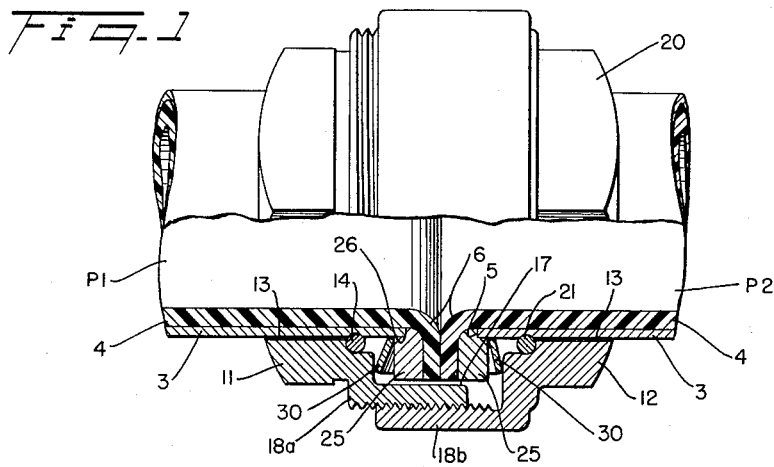
FIG. 1 is a view partly in side elevation and partly in longitudinal section of a pipe joint in accordance with the invention shown in loosely assembled condition.
Figure 2:
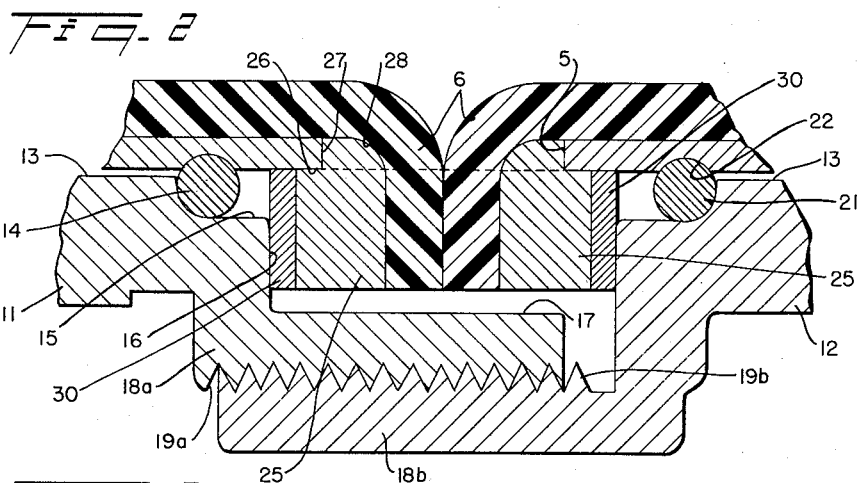
FIG. 2 is an enlarged sectional view corresponding to a portion of FIG. 1 but after coupling members forming the pipe joint have been tightened.

A pipe joint in accordance with the invention is shown by way of example in FIGS. 1 and 2 joining two pipe sections P1 and P2. Each of the pipe sections comprises a shell or casing 3 and a lining 4. The shell 3 is formed of high strength material, for example, steel, and is of sufficient wall thickness to provide the required mechanical strength. The lining 4 is formed of non-metallic material having characteristics suited to the service for which the pipe is intended. To avoid contamination of the line material and conversely to avoid corrosion of the pipe, the lining material is inert with respect to the line material. It should have good resistance to erosion and should be tough and flexible. However, it will ordinarily have a lower strength than the material of the shell. Suitable lining materials are natural and synthetic rubber compositions and synthetic resins for example polyethylene, polystyrene or polyvinylchloride. The lining is of substantial thickness, for example at least half as thick as the shell. As will be seen in FIGS. 1 and 2 the lining material 4 extends beyond the end 5 of the casing and is flared outwardly to provide an annular flange portion 6.

In accordance with the invention, means is provided for making a strong mechanical joint between the casings 3 of successive pipe sections. As illustrated in FIGS. 1 and 2 the pipe sections are joined by cooperating coupling members 11 and 12. The coupling member 11 is formed with a stepped axial bore providing an elongated pipe aperture 13, a shoulder 14 which is preferably arcuate in cross section, an annular recess 15, a radial shoulder 16 and an annular recess 17 defined by an enlarged annular portion 18a which is provided externally with male threads 19a. The coupling member 12 is of like configuration except that it has an enlarged portion 18b which is threaded internally with female threads 19b which mate with the threads 19a of coupling member 11 so that the two coupling members can be screwed together as shown. They are preferably provided with wrench sections 20. Each of the coupling members 11, 12 is connected to the respective pipe section by a split ring 21 of hard material such as spring steel which seats in the recess 15 against the shoulder 14 and also seats in an annular groove 22 formed in the shell 3 spaced from the end of the shell. The groove 22 is formed in the shell by a suitable cutting or rolling operation and is uniformly spaced from the end of the shell so as to lie with its center in a plane perpendicular to the axis of the pipe. The pipe aperture 13 of the coupling members has an inner diameter slightly greater than the outside diameter of the pipe so that the pipe is received snugly in the aperture but the coupling member is free to turn on the pipe. The pipe aperture is of sufficient length to maintain the coupling member substantially in axial alignment with the pipe. The diameter of the annular recess 15 is approximately equal to the diameter of the pipe section as measured to the bottom of the groove 22 plus twice the cross section diameter of the ring 21. Hence the surface defining the recess 15 embraces the outer surface of the ring 21 and confines the ring so that it cannot spring out of the groove 22. The diameter of the recess 17 is sufficiently large to receive the flange portions 6 of the linings 4.

Means is provided for pressing the flange portions 6 of the linings of successive pipe sections together to provide a fluid-tight seal. As illustrated in FIGS. 1 and 2, the flange portions 6 are pressed together by means of backing rings 25. Each of the rings 25 is seated on the end of the respective pipe casing 3. To assure proper alignment with the pipe, the backing ring is provided with an annular recess having a cylindrical surface 26 which fits over an end portion of the shell and a radial surface 27 which engages the end face of the shell. The ring 25 has a rounded, annular, peripheral corner surface 28 that engages the lining to avoid localized stress.

The backing rings 25 are pressed against the flange portions 6 of the linings of the respective pipe sections by resilient means acting between the rings and the radial shoulders 16 of the coupling members. The resilient means is shown in the drawings as a spring washer 30. In relaxed condition the spring washer 30 is dished and assumes the position shown in FIG. 1. When the coupling members 11 and 12 are screwed further together as illustrated in FIG. 2, the spring washers 30 are progressively flattened and are thereby stressed to press the rings 25 against the flange portions 6 and thereby press the flange portions together. It will be seen that the spring washers 30 act through the backing rings 25 to apply a continual pressure to the flange portions 6 of the lining. If the thickness of the flange portions 6 is decreased by "flow" of the elastomer or plastic material forming the lining, the spring washers 30 automatically compensate for any decreased thickness and maintain a fluid-tight seal. Likewise, if there is thermal expansion or contraction of the coupling members 11 and 12 owing to changes in temperature, a fluid-tight seal is nevertheless assured by the continued pressure of the resilient washers 30.

Figure 3:
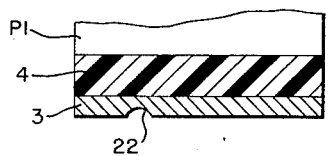
FIGS. 3, 4, 5 and 6 are fragmentary axial sections illustrating successive steps in forming a pipe joint in accordance with the invention.
Figure 4:
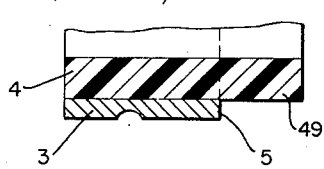
Figure 5:
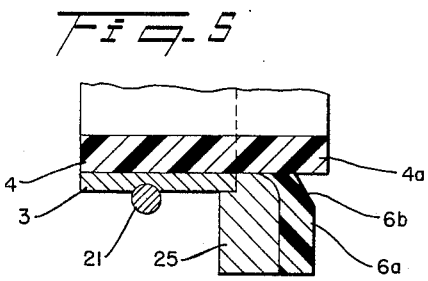
Figure 6:
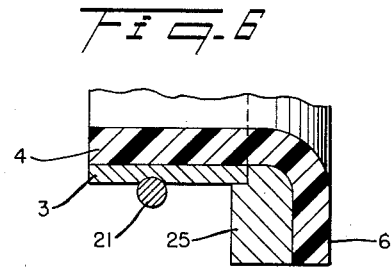

The method of making a pipe joint in accordance with the invention comprises the following steps: Each of the pipe sections is provided with a square end perpendicular to the axis of the pipe as illustrated by way of example in FIG. 3. Using the end face of the pipe as a reference, the annular groove 22 is cut or rolled into the casing 3 at a selected distance from the end. An end portion of the casing 3 is then cut off and removed, leaving a new end face 5 (FIG. 4). A portion 4a of the lining 4 now extends beyond the end of the casing. The corresponding coupling member 11 or 12 is then slipped onto the pipe far enough to be out of the way and the spring ring 21 is snapped into place in the groove 22. The backing ring 25 is seated on the end of the casing 3 and the projecting portion of the lining is flared out over the backing ring to form a flange. If the lining material is thermo-plastic, the flaring of the end portion is readily effected by the application of suitable heat and pressure. In some instances, it is desirable to use additional material in forming the flange. In FIG. 5 such additional material is shown in the form of a ring 6a of plastic material. The ring is preferably provided with a chamfered inner edge 6b. When the ring 6a has been positioned as shown in FIG. 5, heat and pressure are applied, for example by means of a heated die to mold the material to the shape shown in FIG. 6 and simultaneously bond the additional ring 6a with the portion 4a of the lining material. The resulting flange 6 holds the backing ring 27 in position on the end of the casnig 3. However, the backing ring is not otherwise secured to the casing and is free to move axially under the pressure of the springs 30 to take up any slack that may occur in the coupling. After the flanges 6 have been formed, the coupling members 11 and 12 are slid to the adjacent ends of the pipe sections and are screwed together to connect the casings of the two pipe sections. When the coupling members are screwed up to the position shown in FIG. 2, the springs 30 apply force to the backing rings 25 to press the flange portions of the linings together to provide a fluid-tight seal as described above.

The joint thus formed can be readily opened for inspection, maintenance or repair merely by unscrewing the coupling members 11 and 12. The joint can be reopened and recoupled any number of times without deleterious effect.

While a preferred embodiment of the invention has been shown in the drawings and particularly described, it will be understood that the specific construction can be modified without departing from the spirit of the invention as defined by the following claims.

What I claim and desire to secure by Letters Patent is:

1. A joint for lined pipe comprising two sections of pipe each having a metal shell and a lining of non-metallic flexible material, an end portion of the lining of each section extending beyond the end of the metal shell and disposed flared radially outwardly to form an annular flange portion, coupling members surrounding adjacent end portions of said pipe sections respectively, means mechanically connecting each of said members to the shell of its respective section to transmit axial force from said member to said shell, means connecting said members with one another to provide a mechanical connection between the shells of said pipe sections, said coupling members defining an annular recess to receive said flange portions of said linings, resilient means in said recess acting between said coupling members and said flange portions to press said flange portions continually into fluid tight engagement with one another comprising backing rings movable axially relatively to said shells engaging said flange portions and spring washers acting between said rings and said coupling members, each of said backing rings having a portion overlying the end of its respective shell so as to be abutted by the end of the shell, and having a rounded, annular, peripheral corner surface over which the flange portions of the lining is curved to avoid concentration of stresses, and each of said rings having an inside diameter approximately equal to that of the shell.

2. A joint for lined pipe according to claim 1, in which said means mechanically connecting each of said members to the shell of its respective section to transmit axial force from said member to said shell comprises, for each pipe section a locking ring removably fixed axially on the shell of its respective pipe section cooperative with a respective coupling member and confined thereby to releasably connect a respective coupling member to a corresponding pipe section.

3. A joint for lined pipe according to claim 2, in which each of said pipe section shells has an annular groove axially spaced from a respective end thereof to be joined for receiving said locking rings, and in which each of said coupling members has a radial shoulder cooperative with a respective one of said backing rings in a position for precluding axial travel of the coupling members toward one another when engaging said locking rings.

4. A joint for lined pipe according to claim 2, in which said locking rings are metallic split rings.

References Cited in the file of this patent

UNITED STATES PATENTS

| | | |
|---|---|---|
| 459,907 | Hogan | Sept. 22, 1891 |
| 607,180 | Landis | July 12, 1898 |
| 1,033,196 | Roesch | July 23, 1912 |
| 1,510,755 | Weir | Oct. 7, 1924 |
| 1,821,867 | Wilson | Sept. 1, 1931 |
| 1,822,056 | Noble | Sept. 8, 1931 |
| 1,883,086 | Swartz | Oct. 18, 1932 |
| 1,908,844 | Holtson | May 16, 1933 |
| 2,088,922 | Porteous | Aug. 3, 1937 |
| 2,186,974 | Ice | Jan. 16, 1940 |
| 2,201,862 | Heisterkamp | May 21, 1940 |
| 2,359,952 | Welger | Oct. 10, 1944 |
| 2,568,414 | Russ | Sept. 18, 1951 |
| 2,613,958 | Richardson | Oct. 14, 1952 |
| 2,749,154 | Smith | June 5, 1956 |
| 2,773,710 | Smith | Dec. 11, 1956 |

FOREIGN PATENTS

| | | |
|---|---|---|
| 230,956 | Germany | Feb. 9, 1911 |
| 1,050,533 | France | Sept. 3, 1953 |
| 541,021 | Canada | May 21, 1957 |